Feb. 11, 1964     J. W. SZYMANSKI     3,121,098
ORGANOBORON CARBOXYLIC ACID ANHYDRIDES AND
THEIR PREPARATION
Filed Nov. 6, 1959
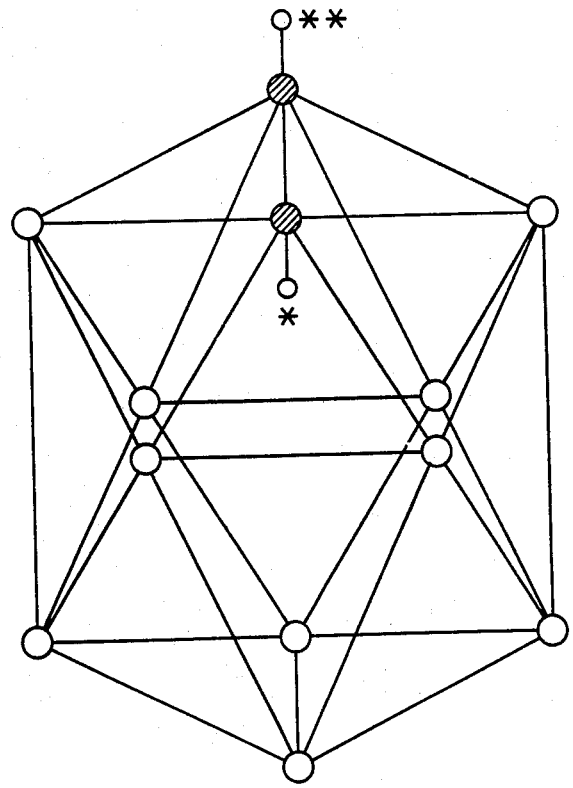
○ BORON
◉ CARBON
o HYDROGEN ON CARBON
(HYDROGEN ATOMS ON BORON
OMITTED FOR CLARITY)
INVENTOR.
JOHN W. SZYMANSKI
BY
*Adams Forward and McLean*
ATTORNEYS

United States Patent Office 3,121,098
Patented Feb. 11, 1964

3,121,098
ORGANOBORON CARBOXYLIC ACID ANHYDRIDES AND THEIR PREPARATION
John W. Szymanski, Niagara Falls, N.Y., assignor to Olin Mathieson Chemical Corporation, a corporation of Virginia
Filed Nov. 6, 1959, Ser. No. 851,471
12 Claims. (Cl. 260—346.8)

This invention relates to organoboron carboxylic acid anhydrides and to a method for their preparation. The organoboron carboxylic acid anhydrides are prepared by the dehydration of organoboron carboxylic acids of the class $RR'B_{10}H_8(CR''CR''')$ wherein R and R' are each hydrogen or an alkyl group containing from 1 to 5 carbon atoms, wherein R'' and R''' are each a carboxyl group or a carboxymethyl group, at least one of R'' and R''' being a carboxyl group, with an inorganic acid halide. The reaction products prepared by the method of this invention are useful as fuels.

Organoboron carboxylic acids of the class $$RR'B_{10}H_8(CR''CR''')$$

wherein R and R' are hydrogen or an alkyl group containing from 1 to 5 carbon atoms, and wherein R'' and R''' are both carboxyl groups, can be prepared according to the method described in application Serial No. 809,569, filed April 28, 1959, to John W. Ager Jr., et al. For example $B_{10}H_{10}[C(COOH)]_2$ can be prepared by reacting $B_{10}H_{10}(CHCH)$ obtained from the reaction of decaborane with acetylene at 125° C., with butyl lithium, treating the reaction mixture thus formed with carbon dioxide and subsequently hydrolyzing and acidifying the carbonated product.

Organoboron carboxylic acids of the class $$RR'B_{10}H_8(CR''CR''')$$

wherein R and R' are hydrogen or an alkyl group containing from 1 to 5 carbon atoms, and wherein one of R'' and R''' is a carboxyl group and one of R'' and R''' is a carboxymethyl group, can be prepared according to the method described in application Serial No. 851,472, filed November 6, 1959, to John W. Ager, Jr., et al.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention, it was discovered that organoboron carboxylic acids of the class $$RR'B_{10}H_8(CR''CR''')$$

wherein R and R' are hydrogen or an alkyl group containing from 1 to 5 carbon atoms, and wherein R'' and R''' are each a carboxyl group or a carboxymethyl group, at least one of R'' and R''' being a carboxyl group, will dehydrate in the presence of an inorganic acid halide dehydrating agent to produce an organoboron carboxylic acid anhydride. Suitable inorganic acid halides include the halides and oxyhalides of phosphorus and sulfur such as thionyl chloride, phosphorous trichloride, sulfuryl chloride, sulfur chloride, phosphorus pentachloride, phosphorus tribromide, phosphorus pentabromide, phosphorus oxychloride, phosphorus oxybromide, and phosphorus triiodide.

The ratio of reactants in the dehydration of organoboron carboxylic acids of the above class with an inorganic acid halide can vary widely, provided sufficient inorganic acid halide is present to accomplish dehydration, generally being within the range of 0.5 to 15 moles of inorganic acid halide per mole of organoboron carboxylic acid and preferably within the range of from 1 to 5 moles of inorganic acid halide per mole of organoboron carboxylic acid. The temperature of the reaction is generally maintained between 20° and 100° C., although the reaction may be conveniently conducted at the reflux temperature of the reaction mixture. A solvent may be employed in the reaction, particularly when all the reactants are in the solid state, and aliphatic hydrocarbon solvents such as n-pentane, hexane and heptane are suitable for this purpose. The reaction is accompanied by the evolution of a hydrohalogen gas, as for example, hydrogen chloride when the inorganic acid halide employed is thionyl chloride, and this gas evolution can be used as a measure of the completensss of the reaction. The reaction generally requires about 0.1 to 10 hours, depending upon the particular reactants and the temperature and pressure employed.

The reaction can be conducted in the presence of sodium carbonate, which can be used to increase the yield of product. The quantity of sodium carbonate employed can be varied widely, but is generally in excess of 1 mole of sodium carbonate per mole of hydrohalogen acid evolved by the reaction.

The process of the invention is illustrated in detail by the following examples, which are to be considered not limitative.

Example 1

10 g. of $B_{10}H_{10}[C(COOH)]_2$ and 10 g. of $Na_2CO_3$ were intimately ground in a mortar and pestle. The mixture was then added to a micro resin kettle fitted with a reflux condenser and a still head condenser and a receiver, a $P_2O_5$ drying tube, bubble off, and a mercury sealed stirrer. The stirrer was started and 7.5 cc. of $SOCl_2$ were added. As 7.5 cc. of $SOCl_2$ did not provide enough liquid, an additional 10 cc. of $SOCl_2$ were added. The reaction mixture was heated to reflux temperature, HCl and $CO_2$ evolved, and the reaction was allowed to proceed for 4 hours. At this time, 50 cc. of n-heptane were added and the reaction mixture was allowed to reflux for another 2 hours. The $SOCl_2$ was distilled off. A small amount of activated charcoal was added, and the mixture was boiled for another 20 minutes. The solution then was filtered and the filter cake washed twice with n-heptane. The filtrate together with the washings then was cooled to −78° and filtered cold, to yield 5.6 g. of product. An additional 1.5 g. of product were isolated from the mother liquid, to give a total of 7.1 g., a 77 percent yield, of $B_{10}H_{10}C_2(CO)_2O$.

Example II 8.0 cc. of $SOCl_2$ were added to 0.813 g. of $$B_{10}H_{10}[C(COOH)]_2$$

in a small flask fitted with a reflux condenser, drying tube, bubble-off, and thermometer. Upon addition, there was no reaction. Slow heating, however, caused the reaction to proceed as was evident from the heat liberated and the gas evolved. The $SOCl_2$ was distilled off. A white crystalline product remained which sublimed at 110° and less than 1 mm. Hg pressure absolute. This product was isolated by sublimation and identified by mass spectrometric analysis as $B_{10}H_{10}C_2(CO)_2O$.

Example III 2.0 g. of $B_{10}H_{10}[C(COOH)]_2$ were treated with 30 cc. of $SOCl_2$. The reaction was carried out as described in Example II and the product was sublimed into a bulb. The product was recrystallized from a heptane-ether mixture. The material was found to darken somewhat at 120° C., but proceeded to melt over the range of 170° to 180° C. with decomposition.

Example IV 1.0 g. of $B_{10}H_{10}[C(COOH)]_2$ and 1.0 gram of $PCl_5$ were slurried in 10 cc. of n-heptane in a small flask fitted with a reflux condenser, drying tube, bubble-off, and thermometer. The reaction mixture was refluxed for 12 hours. The resulting solution was filtered, the filtrate cooled and filtered cold to yield a solid product. Mass spectrophotometric analysis indicated the presence of $B_{10}H_{10}C_2(CO)_2O$.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula $B_{10}H_{10}C_2(CO)_2O$ prepared as described in Examples I through IV has the same structural formula as shown in the accompanying drawing with the exception that the hydrogen atoms indicated by the single and double asterisk are replaced by the radical

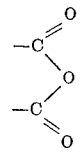

Reference is made to Chemistry of the Hydrides, by Dallas T. Hurd, 1952, for a structural representation of the elementary decaborane molecule. The compounds of the instant invention may be considered as structural derivatives of decaborane, but include in addition atoms of carbon and oxygen.

I claim:

1. Cyclic organoboron carboxylic acid anhydrides having a structural formula of the type shown in the accompanying drawing of the class

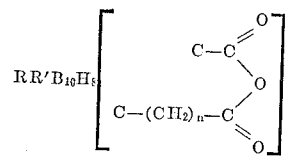

wherein R and R′ are each selected from the class consisting of hydrogen and an alkyl radical containing from 1 to 5 carbon atoms, and n is an integer from 0 to 1.

2.

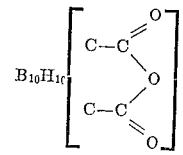

having a structural formula of the type shown in the accompanying drawing.

3. A method for the production of an organoboron carboxylic acid anhydride having a structural formula of the type shown in the accompanying drawing which comprises dehydrating an organoboron carboxylic acid of the class RR′B_{10}H_8(CR″CR‴) wherein R and R′ are each selected from the group consisting of hydrogen and an alkyl group containing from 1 to 5 carbon atoms, wherein R″ and R‴ are each selected from the class consisting of a carboxyl group and a carboxymethyl group, a least one of R″ and R‴ being a carboxyl group, in the presence of from 0.5 to 15 moles per mole of organoboron carboxylic acid of an inorganic acid halide selected from the class consisting of the halides and oxyhalides of phosphorus and sulfur with the formation of hydrogen chloride, and recovering the organoboron carboxylic acid anhydride thus produced.

4. A method for the production of an organoboron carboxylic acid anhydride having a structural formula of the type shown in the accompanying drawing which comprises dehydrating an organoboron carboxylic acid of the class RR′B_{10}H_8(CR″CR‴) wherein R and R′ are selected from the group consisting of hydrogen and an alkyl group containing from 1 to 5 carbon atoms, and wherein R″ and R‴ are each selected from the class consisting of a carboxyl group and a carboxymethyl group, at least one of R″ and R‴ being a carboxyl group, with from 0.5 to 15 mols per mole of organoboron carboxylic acid of an inorganic acid halide selected from the class consisting of the halides and oxyhalides of phosphorus and sulful while in admixture with sodium carbonate, and subsequently recovering the organoboron carboxylic acid anhydride thus formed.

5. The method of claim 3 in which the organoboron carboxylic acid is $B_{10}H_{10}[C(COOH)]_2$.

6. The method of claim 3 in which the inorganic acid halide is thionyl chloride.

7. The method of claim 3 in which the organoboron carboxylic acid is $B_{10}H_{10}[C(COOH)]_2$ and in which the inorganic acid halide is thionyl chloride.

8. The method of claim 3 in which the inorganic acid halide is phosphorus pentachloride.

9. The method of claim 3 in which the organoboron carboxylic acid is $B_{10}H_{10}[C(COOH)]_2$ and in which the inorganic acid halide is phosphorus pentachloride.

10. The method of claim 4 in which the organoboron carboxylic acid is $B_{10}H_{10}[C(COOH)]_2$.

11. The method of claim 4 in which the inorganic acid halide is thionyl chloride.

12. The method of claim 4 in which the organoboron carboxylic acid is $B_{10}H_{10}[C(COOH)]_2$ and the inorganic acid halide is thionyl chloride.

No references cited.

UNITED STATES PATENT OFFICE
CERTIFICATE OF CORRECTION

Patent No. 3,121,098                                   February 11, 1964

John W. Szymanski

It is hereby certified that error appears in the above numbered patent requiring correction and that the said Letters Patent should read as corrected below.

Column 4, line 52, for "a", third occurrence, read -- at -- lines 72 and 73, for "sulful" read -- sulfur --.

Signed and sealed this 8th day of September 1964.

(SEAL)
Attest:

ERNEST W. SWIDER                                  EDWARD J. BRENNER
Attesting Officer                                     Commissioner of Patents